United States Patent [19]

Buck

[11] Patent Number: 4,512,814
[45] Date of Patent: Apr. 23, 1985

[54] BRUSH CONDITIONER FOR CAR WASH

[76] Inventor: James C. Buck, 269 Margaret St., Plattsburgh, N.Y. 12901

[21] Appl. No.: 547,859

[22] Filed: Nov. 2, 1983

[51] Int. Cl.³ .............................................. B08B 3/10
[52] U.S. Cl. ...................................... 134/34; 134/42; 134/105; 134/154; 134/182
[58] Field of Search ................ 134/34, 105, 154, 182, 134/183, 42; 401/131

[56] References Cited

U.S. PATENT DOCUMENTS

| | | |
|---|---|---|
| 957,989 | 5/1910 | McLeod . |
| 2,569,125 | 9/1951 | Costantino ........................ 134/182 |
| 2,576,185 | 11/1951 | Mac Kenzie . |
| 2,640,489 | 6/1953 | Boland . |
| 2,994,329 | 8/1961 | Catlin et al. . |
| 3,103,312 | 9/1963 | Damrow . |
| 3,265,087 | 8/1966 | Livingston . |
| 3,314,659 | 4/1967 | Ranson ........................ 134/183 X |
| 3,657,763 | 4/1972 | Hurd . |
| 3,904,431 | 9/1975 | Dinerman ........................ 134/182 X |
| 4,018,240 | 4/1977 | Palthe . |

Primary Examiner—Marc L. Caroff
Attorney, Agent, or Firm—Bruns & Wall

[57] ABSTRACT

A heated bath of cleaning liquid is contained in an open top trough into which the bristles of a long handled car washing brush, having a nozzle enclosed within the bristles, are immersed. The edges along the top opening of the trough are provided with flow deflectors that are arranged to redirect liquid moving up the inside wall of the trough back into the bath. The handle is held in a stored position so that the nozzle directs cleaning fluid delivered thereto downwardly into the bath. Cleaning fluid is pulsed through the nozzle to produce heavy agitation in the bath to scrub soils from the brush bristles.

7 Claims, 4 Drawing Figures

U.S. Patent    Apr. 23, 1985    Sheet 1 of 2    4,512,814
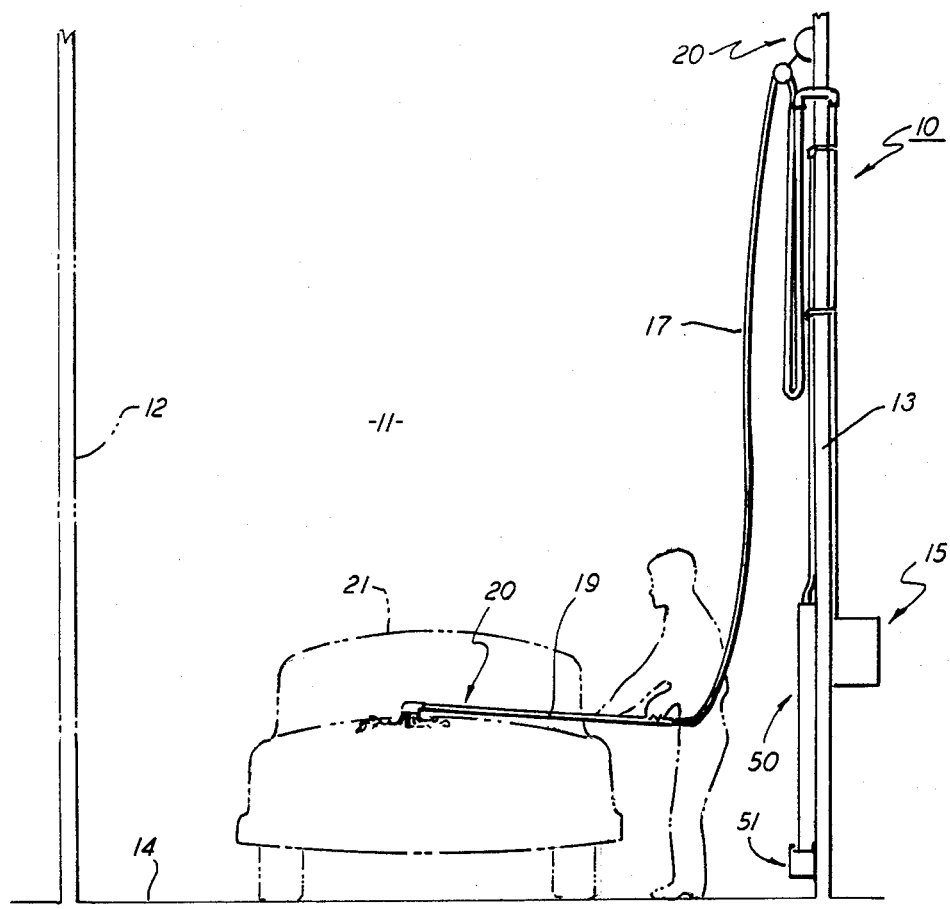
FIG. 1
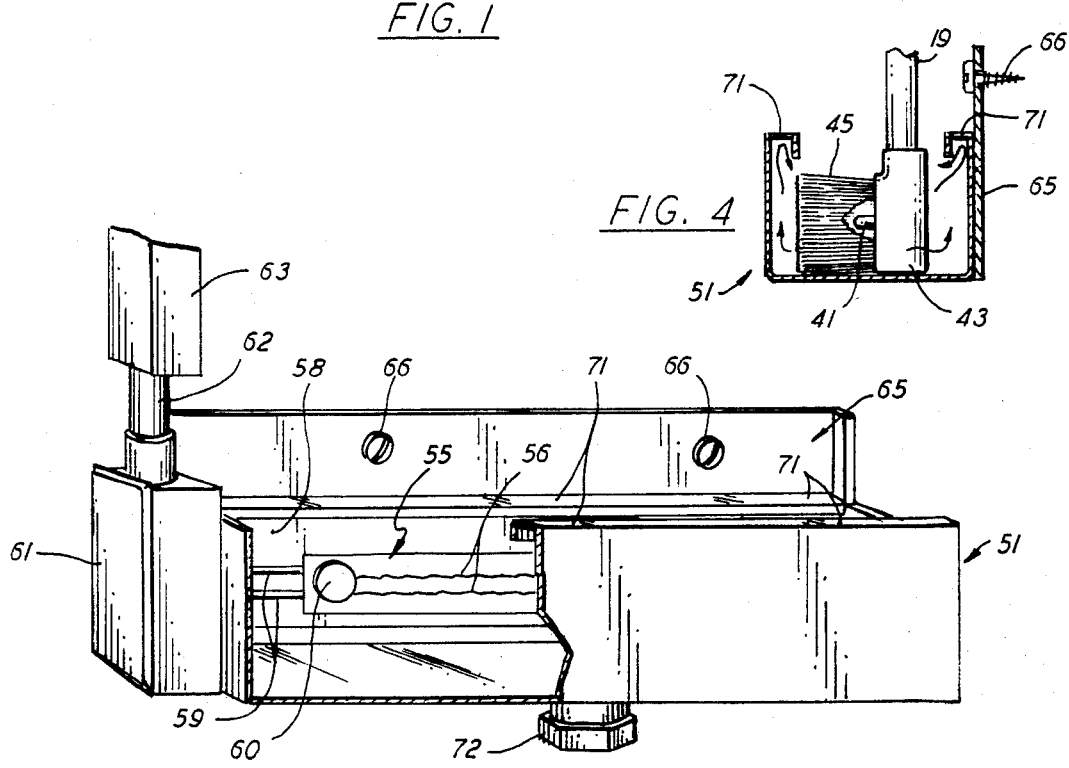
FIG. 4
FIG. 3

BRUSH CONDITIONER FOR CAR WASH

BACKGROUND OF THE INVENTION

This invention relates generally to self service car washes and, in particular, to means for cleaning and storing a car washing brush when the brush is not in use.

In most coin operated car washes, the customer, upon placing a predetermined amount of money into the automatic washing apparatus, selects a desired wash cycle best suited for cleaning his vehicle. In response to the selection, a control unit will selectively program a number of valves which, in turn, deliver water and other ingredients to a hose in an ordered sequence to clean and sometimes wax the automobile. Typically, a supply hose from the control valve unit is connected to a long handled brush having one or more openings located behind the brush bristles. The brush handle is usually hollow and serves to connect the openings to the hose. In practice, the brush is used to dislodge soils from the surface of the automobile and also to evenly distribute cleaning liquids thereover.

The hose and brush equipment is generally contained in unheated bays that are difficult to maintain during winter months. The amount of soils collected upon the surface of an auto increases dramatically during cold months because of the use of salt and sand on the road surface. Accordingly, wash brushes become contaminated with dirt and grime that can scratch or otherwise mar a car's finish. To add to the problem, the wetted bristles can also become frozen whereupon the brush becomes completely useless. To combat these problems some self service car was operators simply remove the brush during the winter months leaving only a high pressure long handled "wand" for the customer to use. Any scrubbing must be accomplished by hand held sponges or rags thereby making the cleaning job a cold, wet and difficult task. As a consequence, removal of dirt, grime and, in particular, corrosion producing salts from the vehicle is sometimes less than satisfactory during periods where a thorough cleaning is most warranted.

As a result of a pre-examination search, the following patents of interest were uncovered:

| | |
|---|---|
| 957,989 | 3,265,087 |
| 2,576,185 | 3,657,763 |
| 2,640,489 | 3,103,312 |
| 2,994,329 | 4,018,240 |

For the most part, these prior art patents relate to devices for cleaning paint brushes and industrial brushes of various types wherein the brush is placed in a remote fixture and acted upon by another brush and/or a cleaning solvent. In all cases, the brush must be further conditioned through drying or remounting in the original equipment before it can be placed back in service. The remaining patents involve car washing equipment for heating cleaning liquids used in the wash cycle and for mounting the supply hoses so they cannot become entangled during the washing process.

SUMMARY OF THE INVENTION

It is therefore an object of the present invention to improve self service car washes.

It is a further object of the present invention to protect the finish of motor vehicles that are washed in coin operated self service installations.

Another object of the present invention is to continually remove soils from the bristles of a cleaning brush used in a self service car wash.

Yet another object of the present invention is to allow coin operated car washes to operate efficiently during the winter months in areas of the country having a relatively cold winter climate.

A still further object of the present invention is to scrub the bristles of a car wash brush with a heated cleaning liquid before each wash cycle to remove soils from the bristles.

These and other objects are attained in a self service car wash by means of an open topped trough in which the bristles of a long handled auto cleaning brush are immersed in a heated bath of cleaning liquid used in the wash cycle. The trough is provided with flow deflectors that are arranged to redirect bath fluid striking the deflectors back into the bath. Cleaning liquid is pumped into the bath through the brush nozzle with sufficient pressure to drive the bath liquid against the deflectors to produce sufficient agitation in the bath to scrub soils from the brush bristles.

BRIEF DESCRIPTION OF THE DRAWINGS

For a better understanding of these and other objects of the present invention reference is had to the following detailed description of the invention which is to be read in conjunction with the accompanying drawings, wherein:

FIG. 1 is a schematic view in side elevation illustrating a self service auto wash installation showing a motor vehicle and an operator in phantom outline;

FIG. 3 is an enlarged view in perspective of a trough for storing the bristles of the brush utilized in the present installation; and FIG. 4 is an end view in section showing a brush being cleaned in the trough shown in FIG. 3.

DESCRIPTION OF THE INVENTION

Figure 2:
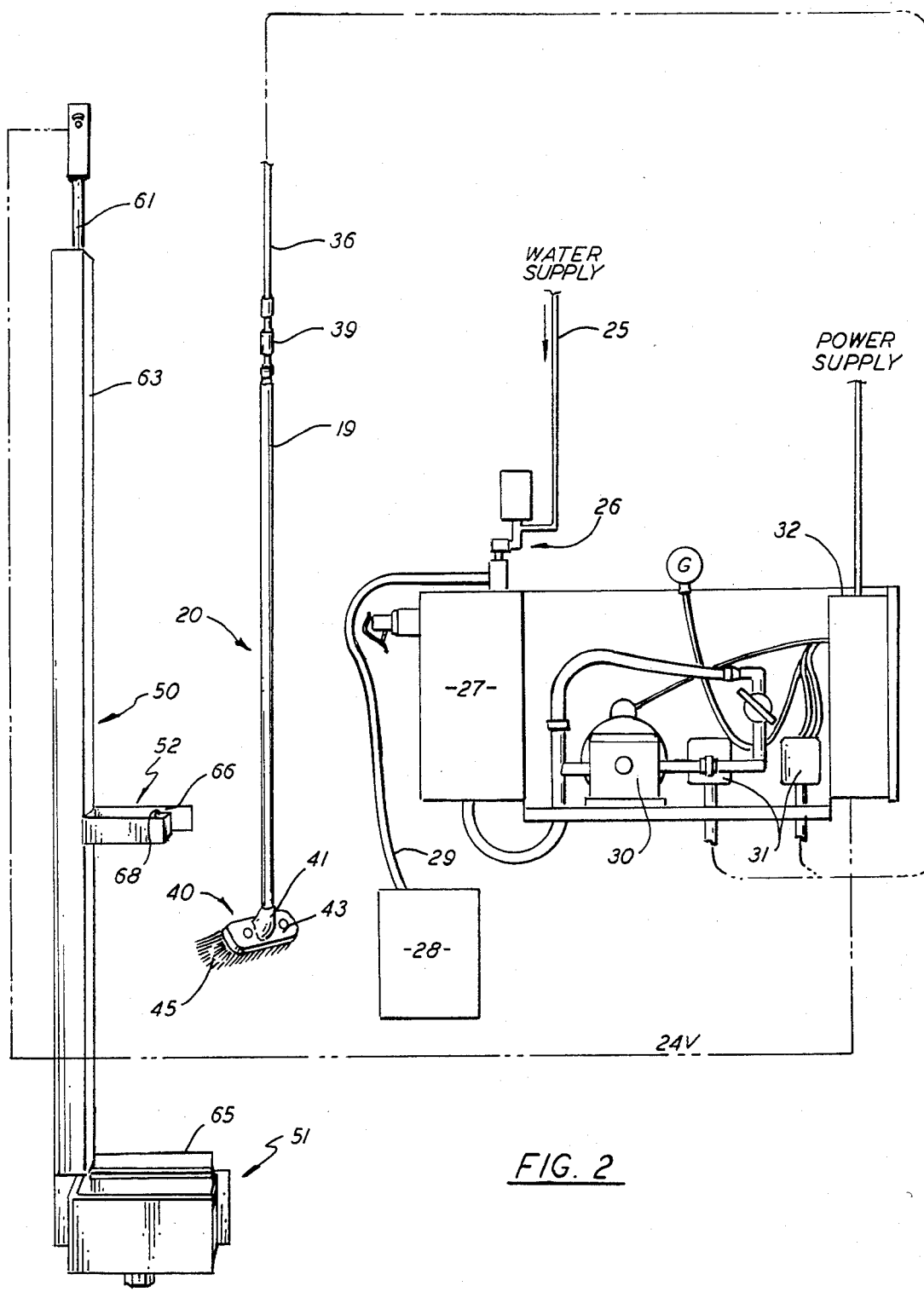
FIG. 2 is a diagrammatical view of the fluid handling equipment utilized in the installation shown in FIG. 1.

Turning initially to FIG. 1, there is shown a coin operated auto washing installation generally referenced 10. The installation includes a wash bin 11 having a pair of side walls 12 and 13 and a concrete floor 14 containing suitable drains (not shown) for carrying away water and cleaning fluids used in the wash process. The wash fluid handling equipment 15 is stored on the far side of the right hand wall 13 in what might be, in practice, a heated service room. A hose 17 passes through the wall 13 and connects the wash handling equipment with the elongated handle 19 of a wash brush 20. The hose is wound upon a take-up mechanism 20 that prevents it from becoming entangled as the operator moves about the vehicle 21 being cleaned.

Turning now to FIG. 2, there is shown diagrammatically apparatus particularly useful as a part of a self service installation of the type wherein the customer parks his vehicle in the bay as shown in FIG. 1 and pays a specified amount that allows him or her a specific time in which to clean the vehicle with the equipment provided. In such an installation, there is provided a source of water 25 that is directed by a suitable mixing valve 26 to a chemical mixing tank 27. A chemical cleaning agent, such as liquid detergent, is drawn on demand from a supply reservoir 28 via line 29 where it is thoroughly mixed with incoming water. The liquid leaving the tank may be selectively routed to a high pressure pump 30 or directly to a series of electrically operated control valves, as for example valves 31—31, that are sequenced in a pre-programmed order in response to commands from the electrical control box 32. The liquid passing through the pump is raised to a higher pressure to produce a high velocity spray at the brush nozzle.

Depending on the type of wash selected by the customer, the valves are cycled to bring liquid to the cleaning brush unit, generally depicted at 20, via a line 36. The brush unit includes the previously noted elongated hollow handle 19 formed of a relatively strong lightweight material that is joined to hose 36 by means of a connector 39. The distal end of the handle joins the brush head 40 at a nozzle assembly 41. The nozzle assembly passes through the back plate 43 of the brush that is capable of discharging a high presure spray of liquid through the brush bristles 45 along a flow path that is generally parallel with the bristles.

As best illustrated in FIGS. 1 and 2, the brush, when not in use, is stored in a mounting fixture referenced generally 50. The mounting fixture includes an open topped trough 51 that is adapted to receive the brush head 40 therein and a retaining bracket 52 (FIG. 2) that is adapted to encircle the brush handle to support the handle in a generally vertical position. The trough is a generally rectangular shaped container that is water tight. The depth of the container is sufficient to completely house the brush head when it is inserted therein through the top opening. Normally a bath of cleaning fluid is maintained in the trough at a level that is high enough to immerse the brush bristles within the fluid.

As illustrated in FIG. 3, a heating unit 55 is placed within the trough well below the normal liquid level. The unit consists of a series of electrical heating elements 56—56 that are encapsulated within a thin plastic blanket 57 that can be attached to one of the inside surfaces of the trough. Preferably the blanket is secured to the back wall 58 of the trough so that soils cleaned from the brush do not cover the heating elements and adversely affect their heating capability. A preset thermostat 60 is also contained within the blanket which is used to control the bath temperature. Typically, the thermostat will be set to about 40° F. to insure that the water in the bath liquid will not freeze. Although an immersible unit is herein shown, it has been found that the heater can be placed against the outside surface of a trough wall and sufficient heat will pass through the wall to keep the bath liquid from freezing.

The heating blanket connectors 59—59 are passed out of the trough into a junction box 61 affixed to the end wall of the trough. The service wires are carried via an electrical conduit 62 to a suitable source of power. The conduit passes vertically along the bay wall 13, to which the trough is affixed, and is enclosed within a pipe chase 63. The trough is secured by any suitable means to a back plate 65 which, in turn, is affixed to the wall 13 by means of lag screws 66—66 or the like. The trough is positioned close to the floor of the bay so that fluids passing out of the trough can be carried quickly to a drain without undue splashing.

The retaining bracket 52 is secured to the pipe chase 63 and the bay wall 13 directly over the trough opening. The bracket is formed of heavy gauge sheet metal into a G-like configuration. The open side 66 of the bracket is disposed outwardly from the pipe chase and is wide enough to allow the brush handle to be passed into the bracket. With the brush head contained in the trough, as shown in FIG. 4, the handle of the brush can be positioned behind the inwardly turned leg 68 of the bracket. The spring-like action of the brush bristles will thus tend to bias the handle against the leg and thus hold the brush in a vertical or upright position.

When the brush is supported within the trough in an upright position, the brush nozzle 41 will be pointing so as to direct a liquid spray into the bath contained in the trough. As shown in FIG. 4, the nozzle is placed in the bath so that it is pointed at one of the interior walls of the trough. Initially, at the start of each wash cycle, cleaning fluid is pulsed through the nozzle with sufficient force to bring the bath to a highly agitated state. The customer is notified to leave the brush in the trough during this initial cycle. The front and back edges of the trough opening are each provided with flow deflectors 71—71 which serve to turn fluid moving up the wall of the trough back into the bath. In practice, the deflectors are formed by turning the top edges of the trough inwardly and downwardly to form a channel-like lip along each edge. Upon pulsing the flow of cleaning fluid initially delivered to the brush nozzle, a highly agitated flow of cleaning fluid is created within the trough bath which serves to scrub the brush fibers with sufficient force to drive soils from their surfaces. Excess fluid entering the trough is allowed to spill over the end walls and is eventually directed to one of the bay floor drains. Excess fluid, being in a highly agitated state, tends to carry the soil from the trough suspended therein. Any soils collected in the trough are removed periodically via a service drain plug 72.

As can be seen, through use of the present apparatus, the cleaning brush is caused to soak in the heated bath between cycles in a relatively uncontaminated liquid containing a cleaning agent. As a result, soils, dirt, grime and any other contaminants held on the brush bristles are loosened. Upon the application of the initial high pressure cycle, the highly agitated liquid scrubs the loosened soils from the brush and carries the soil quickly to the drain system of the installation. Accordingly, despite cold weather and heavy filming of the vehicles, the brush is always maintained in a clean, unfrozen condition that enables it to be used effectively without danger of damaging the vehicle's finish. This, in turn, enables the operator to provide satisfactory service to his customers during periods when washing is most needed.

While this invention has been described with reference to the structure disclosed herein, it is not confined to the details set forth and this application is intended to cover any modifications or changes as may come within the scope of the following claims.

I claim:

1. In a self service car wash of the type wherein a cleaning liquid is brought to a nozzle enclosed within the bristles of a cleaning brush through an elongated handle attached to the brush, the nozzle being arranged to direct a liquid spray generally parallel to the brush bristles, apparatus for storing and cleaning the brush that includes a trough having a top opening for holding a bath of cleaning liquid in which the bristles of said stored brush are immersed and the handle of the brush is passed upwardly in a vertical direction, through said opening, said trough having flow deflectors disposed along the front and back edges of the opening shaped to cause bath liquid striking the deflectors to be directed back into the bath, support means for releasably engaging the upwardly disposed handle of the brush so as to point the nozzle thereof at a wall of the trough, control means for delivering liquid under pressure to the nozzle so that liquid in the bath is forced upwardly along said wall to strike the deflectors to create heavy agitation within the bath for scrubbing the bristles, and a heater means for maintaining the bath at a temperature that is above the bath liquid freezing temperature.

2. The apparatus of claim 1 wherein the deflectors are formed by inwardly and downwardly turned lips on the said edges of the trough opening.

3. The apparatus of claim 1 wherein said heater is en electrical heating strip mounted along one wall of the trough.

4. The apparatus of claim 1 that further includes a removable drain plug in the bottom wall of the trough for removing soils cleaned from the brush.

5. A method of storing and cleaning a long handled car washing brush having a nozzle for directing a stream of liquid through the brush bristles that includes the steps of immersing the brush bristles within a bath of liquid cleaner contained within a trough having a top opening, supporting the brush handle so that the nozzle is directed at a wall of the trough, sending a stream of liquid through the nozzle with sufficient pressure to agitate the bath liquid and force it upwardly along said wall, redirecting the agitated bath liquid back toward the brush bristles whereby the bristles are scrubbed by the liquid, and heating the bath liquid to a temperature above the freezing temperature of the said liquid.

6. The method of claim 5 that includes the further step of collecting soils removed from the brush in a sump and periodically removing the soils from the sump.

7. The method of claim 5 that includes the further step of pulsing the liquid that is sent through the nozzle.

* * * * *